United States Patent
Smith

(10) Patent No.: US 8,787,531 B1
(45) Date of Patent: *Jul. 22, 2014

(54) SYSTEMS AND METHODS FOR PROVIDING INSTANT MESSAGING TO TDD/TTY USERS

(71) Applicant: United Services Automobile Associate (USAA), San Antonio, TX (US)

(72) Inventor: Dena L. Smith, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,550

(22) Filed: Dec. 10, 2012

Related U.S. Application Data

(63) Continuation of application No. 11/853,291, filed on Sep. 11, 2007, now Pat. No. 8,331,541.

(51) Int. Cl.
| | |
|---|---|
| *H04M 11/00* | (2006.01) |
| *H04B 7/00* | (2006.01) |
| *H04M 1/00* | (2006.01) |
| *H04M 3/42* | (2006.01) |

(52) U.S. Cl.
USPC .......... 379/52; 370/338; 370/352; 379/88.13; 379/88.18; 379/142.08; 455/41.2; 455/404.1; 455/466; 455/517; 455/557; 704/271; 725/106

(58) Field of Classification Search
CPC ............... G06Q 10/107; H04M 11/00; H04M 1/72552; H04M 1/72591; H04M 4/42
USPC ......... 379/52, 88.13, 88.18, 142.08; 455/466, 455/41.2, 404.1, 517, 552.1, 557; 704/271; 370/338, 352; 725/106
See application file for complete search history.

(56) References Cited

U.S. PATENT DOCUMENTS

| | | | | |
|---|---|---|---|---|
| 5,253,285 | A | * | 10/1993 | Alheim ............................ 379/52 |
| 5,450,470 | A | * | 9/1995 | Alheim ............................ 379/52 |
| 5,521,960 | A | * | 5/1996 | Aronow .......................... 379/52 |
| 5,745,550 | A | | 4/1998 | Eisdorfer et al. |
| 5,974,116 | A | * | 10/1999 | Engelke et al. ................. 379/52 |
| 6,188,429 | B1 | | 2/2001 | Martin et al. |
| 6,421,425 | B1 | | 7/2002 | Bossi et al. |
| 6,493,558 | B1 | * | 12/2002 | Bernhart et al. .............. 455/466 |
| 6,603,835 | B2 | | 8/2003 | Engelke et al. |
| 6,611,804 | B1 | | 8/2003 | Dorbecker et al. |
| 6,628,967 | B1 | | 9/2003 | Yue |
| 6,668,043 | B2 | * | 12/2003 | Hyziak et al. ................... 379/52 |

(Continued)

OTHER PUBLICATIONS

Tucker, William, et al., "SoftBridge in Action: The First Deaf Telephony Pilot," Proc. SATNAC; 2003, pp. 1-2, George, South Africa.

(Continued)

*Primary Examiner* — Gerald Gauthier
(74) *Attorney, Agent, or Firm* — Fish & Richardson P.C.

(57) ABSTRACT

Instant messaging (IM) is provided between a TDD/TTY user and an entity. The user may use a TDD device to initiate a call with the entity. One or more converters may convert a TDD message from the user's device to IM, which is then provided to a recipient of the call, such as a representative of a company. The converter(s) may also convert IM from the representative into a TDD message that may then be provided to the user on the TDD device.

20 Claims, 8 Drawing Sheets

(56) References Cited

U.S. PATENT DOCUMENTS

| | | | |
|---|---|---|---|
| 6,950,501 B1 | 9/2005 | Chaturvedi et al. | |
| 6,987,985 B2 * | 1/2006 | Purkayastha et al. | 455/552.1 |
| 7,079,628 B1 * | 7/2006 | Burritt et al. | 379/52 |
| 7,142,642 B2 * | 11/2006 | McClelland et al. | 379/52 |
| 7,200,208 B2 * | 4/2007 | Smith et al. | 379/52 |
| 7,204,746 B2 * | 4/2007 | Purkayastha et al. | 455/552.1 |
| 7,277,858 B1 * | 10/2007 | Weaver et al. | 704/271 |
| 7,573,987 B1 * | 8/2009 | Block et al. | 379/88.13 |
| 7,778,858 B1 | 8/2010 | Daily et al. | |
| 7,843,899 B2 * | 11/2010 | Burritt | 370/352 |
| 7,844,246 B2 * | 11/2010 | Groskreutz et al. | 455/404.1 |
| 7,844,547 B2 | 11/2010 | Amos | |
| 7,940,702 B1 | 5/2011 | Donley et al. | |
| 8,331,541 B1 * | 12/2012 | Smith | 379/88.18 |
| 2003/0016657 A1 * | 1/2003 | Creamer et al. | 370/352 |
| 2005/0048992 A1 * | 3/2005 | Wu et al. | 455/466 |
| 2005/0054380 A1 * | 3/2005 | Michaelis | 455/557 |
| 2005/0086699 A1 * | 4/2005 | Hahn et al. | 725/106 |
| 2005/0094775 A1 * | 5/2005 | Smith et al. | 379/52 |
| 2005/0094776 A1 * | 5/2005 | Haldeman et al. | 379/52 |
| 2005/0254635 A1 * | 11/2005 | Koretsky et al. | 379/142.08 |
| 2007/0208618 A1 | 9/2007 | Paintin et al. | |

OTHER PUBLICATIONS

Lewis, John, et al. "Softbridge A Multimodal Instant Messaging Bridging System," Proc. SATNAC, 2003, pp. 1-6, George, South Africa.

Henderson, Valerie, et al. "Electronic Communication by Deaf Teenagers", Technical Report GIT-GVU-05-34, Oct. 2005, Georgia Institute of Technology, CVU Center, College of Computing, Atlanta, Georgia, pp. 1-21.

Power, Mary R., et al. "Everyone Here Speaks TXT; Deaf People Using SMS in Australia and the Rest of the World," Journal of Deaf Studies and Deaf Education, 2004, pp. 1-11, vol. 9 No. 3, Oxford University Press.

* cited by examiner

SYSTEMS AND METHODS FOR PROVIDING INSTANT MESSAGING TO TDD/TTY USERS

CROSS-REFERENCE TO RELATED APPLICATIONS

This application is a continuation application of U.S. patent application Ser. No. 11/853,291, filed Sep. 11, 2007, now U.S. Pat. No. 8,331,541, and is related by subject matter to that disclosed in the following commonly assigned applications, the entirety of which are hereby incorporated by reference herein: U.S. patent application Ser. No. 11/853,305, filed Sep. 11, 2007 and U.S. patent application Ser. No. 11/853,315, filed Sep. 11, 2007.

BACKGROUND

Currently, hearing-impaired users communicate with representatives of entities, such as financial services companies, through TDD (telecommunications devices for the deaf) and TTY (telephone typewriter) devices. This process requires a third party to relay information between the user and the representative. The third party receives TDD/TTY signals and verbally relays the information to the representative, and then receives spoken information from the representative and provides it via TDD/TTY to the user. This often leads to confusion for the hearing-impaired user and the representative. Additionally, the presence of a third party, unknown to the user, presents potential security concerns for the user.

As an example, Telecommunications Relay Service (TRS), is an operator service that allows people who are hearing-impaired to place calls to standard telephone systems via TDD/TTY, personal computer, or other assistive telephone devices. A common type of TRS call involves a call from a person who is hearing-impaired and utilizes a TDD/TTY to a person who is not hearing impaired and can both hear and speak. In such a call, typed messages are relayed as voice messages by a TRS operator, and vice-versa. This allows callers who are unable to use a standard telephone to be able to place telephone calls to people who use a standard telephone, and vice-versa. When the person who is hearing is ready for a response, it is customary for that person to say "Go Ahead" or "GA" to indicate that it is the TDD/TTY user's turn to talk, and "Stop Keying", "SK", or "Ready to hang up" when it is time to hang up, and vice-versa. Hence, this process is time-consuming, expensive, and may be frustrating for both the calling party and the recipient of the call.

SUMMARY

Instant messaging (IM) is provided between a TDD/TTY user and an entity. The user may use a TDD device to initiate a call with the entity. One or more converters may convert a TDD message from the user's device to IM, which is then provided to a recipient of the call, such as a representative of a company. The converter(s) may also convert IM from the representative into a TDD message that may then be provided to the user on the TDD device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustration, there are shown in the drawings example constructions of the embodiments; however, the embodiments are not limited to the specific methods and instrumentalities disclosed. In the drawings.

DETAILED DESCRIPTION

Figure 1:
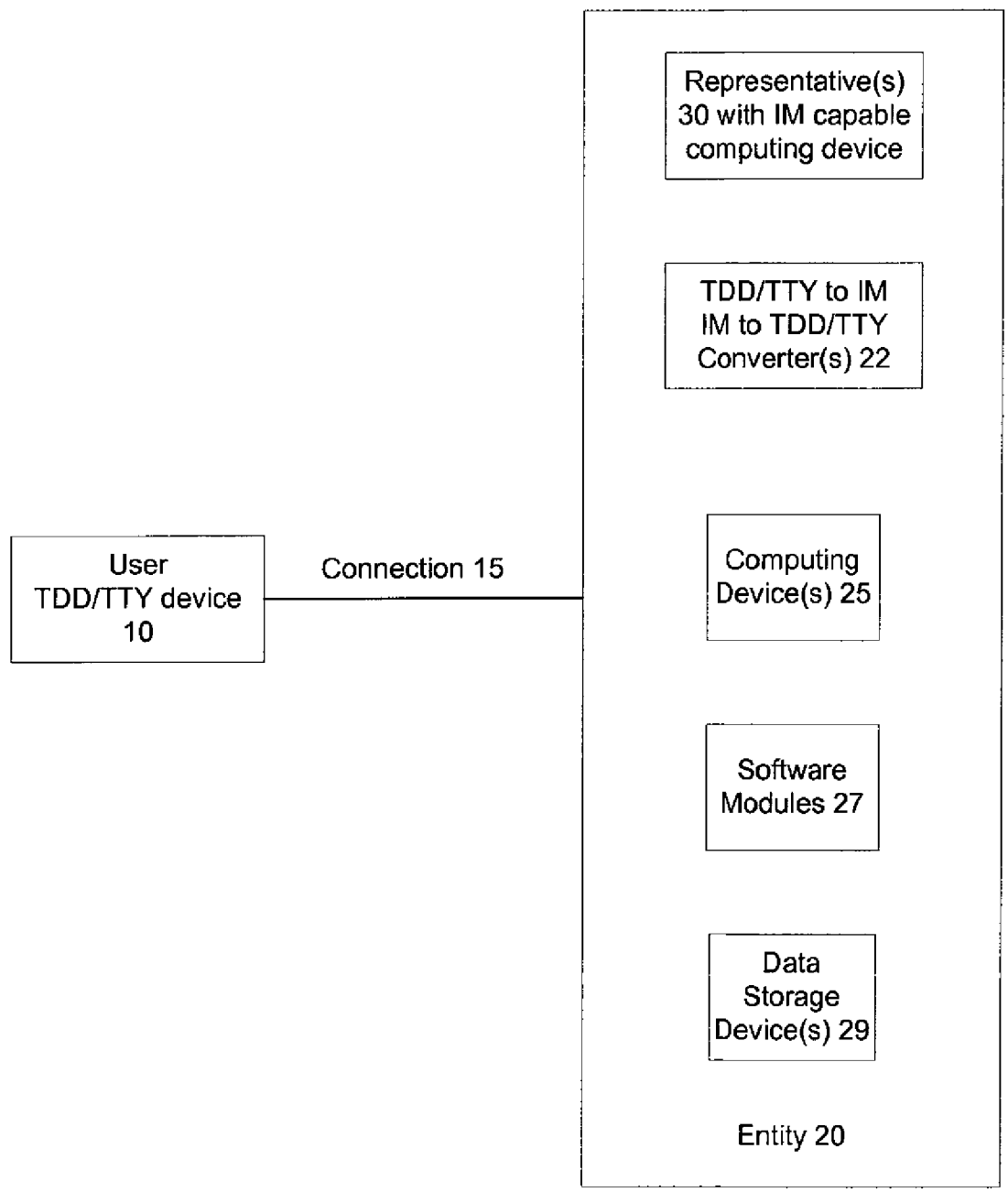
FIG. 1 is a block diagram of an implementation of a system that provides instant messaging between a TDD/TTY user and a recipient of a call from the TDD/TTY user.

FIG. 1 is a block diagram of an implementation of a system that provides instant messaging (also referred to herein as IM) between a TDD/TTY (also referred to herein as TDD) user and a recipient of a call from the TDD/TTY user. Instant messaging is a form of real-time communication between two or more parties based on typed text. Instant messaging uses an instant messaging client that connects to an instant messaging service. Many IM clients are known, such as Microsoft's Windows Messenger, Yahoo's Instant Messenger, and AOL's Instant Messenger.

A connection 15 is established between a TDD device 10 and an entity 20. A user may use the TDD device 10 to initiate a call with the entity 20, or vice-versa. The TDD device 10 may be any known TDD equipment or electronic device for text communication via a telephone line, or any computing device that has been equipped to emulate the functionality of a TDD device. A typical TDD device is about the size of a small laptop computer with a keyboard and small screen to display typed text. In addition, TDD devices commonly have a small spool of paper on which text may be printed. The text is transmitted live, via a telephone line, to a compatible device, e.g., one that uses a similar communication protocol. As described herein, the text transmitted by a TDD device is converted to an IM protocol. An example computing device is described with respect to FIG. 8.

The entity 20 may be a company, such as a financial services company or bank, for example, that comprises one or more converters 22 that convert a TDD message to IM, and IM to a TDD message, described further below. The converter(s) 22 may convert a TDD message from a user's device 10 to IM, which is then provided to the recipient of the call, such as a representative 30 of the entity 20. The converter(s) 22 may also convert IM from the representative 30 into a TDD message, which may then be provided to the user on the TDD device 10. The conversions may be performed by the same converter device and/or module or by different converter devices and/or modules. Various TDD protocols and various IM protocols, described further herein, may be supported and may be used interchangeably.

In an implementation, one or more representatives 30 are associated with the entity 20, and may have one or more computing device(s) 25 on which to receive and transmit IM messages. The entity 20 may also comprise one or more computing device(s) 25 that may operate in conjunction with software modules 27 and one or more data storage device(s) 29. The storage device(s) 29 may contain user information that had been previously received and stored, e.g., with respect to a user's accounts. This data may be personal information such as the user's marital status, age, address, account information, etc., for example, and may be used to confirm the identity of the user or to personalize data pertaining to the user that is presented to the representative. An example computing device is described with respect to FIG. 8.

Software modules 27 are shown that may be used in the performance of the example techniques described herein in conjunction with the other various elements and components described herein. Example software modules include modules for maintaining a connection between a user and a representative, retrieving user and other data from storage, performing conversions and translations between various protocols, packaging information for transmission, and generating information that may be useful to the representative and the user, described further herein. While specific functionality is described herein as occurring with respect to specific modules, the functionality may likewise be performed by more, fewer, or other modules. The functionality may be distributed among more than one module.

As noted above, a connection 15 is established between the TDD device 10 and the entity 20. The connection 15 may comprise a telephone network, a local area network, a wide area network, the Internet, or any combination thereof, for example.

Figure 2:
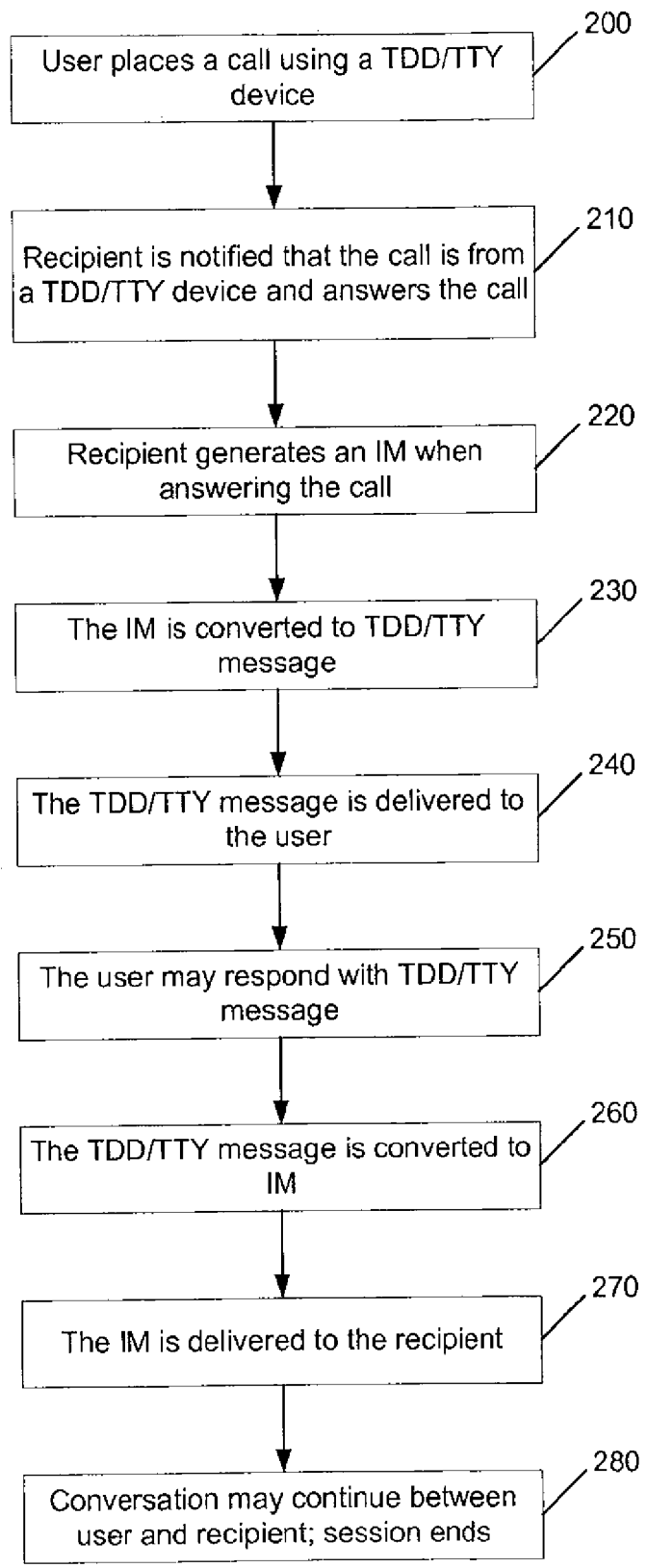
FIG. 2 is an operational flow of an implementation of a method that provides instant messaging between a TDD/TTY user and a recipient of a call from the TDD/TTY user.

FIG. 2 is an operational flow of an implementation of a method that provides instant messaging between a TDD user and a recipient of a call from the TDD user. The recipient may be a representative of an entity, such as a financial services company or a bank, for example.

At operation 200, a user places a call through a TDD device to the entity. A representative associated with the entity is notified that the incoming call is from a TDD device, at operation 210. The notification may be in the form of a displayed window, message, or other indicator on the representative's computer monitor or display, or it may be a notification over the representative's telephone, for example. In an implementation, a button, icon, or link, for example, is provided that the representative can select to answer the call and begin an instant messaging conversation with the user.

At operation 220, the representative generates an instant message in answering the call. The instant message may request authentication information from the user, or may be another type of greeting, for example. Authentication of the user may involve a password, code, credential, key, etc. Authentication techniques are well known and their descriptions are omitted for brevity. The instant message is converted to a TDD message at operation 230, by converting the IM protocol to the TDD protocol, and the TDD message is then transmitted to the user at operation 240.

The user receives the TDD message at the TDD device, and may respond with a TDD message at operation 250. The TDD message sent by the user's device is received and converted to an instant message at operation 260, by converting the TDD protocol to the IM protocol, and is then delivered to the representative at operation 270. In this manner, a two-way conversation may continue between the user and the representative, at operation 280, until the session ends. It is contemplated that timestamps may be used so that messages between the user and the representative do not overlap.

Thus, a user may converse with a representative, or other call recipient, via TDD messages translated to IM messages, using their TDD device or a properly-equipped computing device. Because there is no need for a third party translator, time and expense are saved, and the user's information will be more secure and private.

Figure 3:
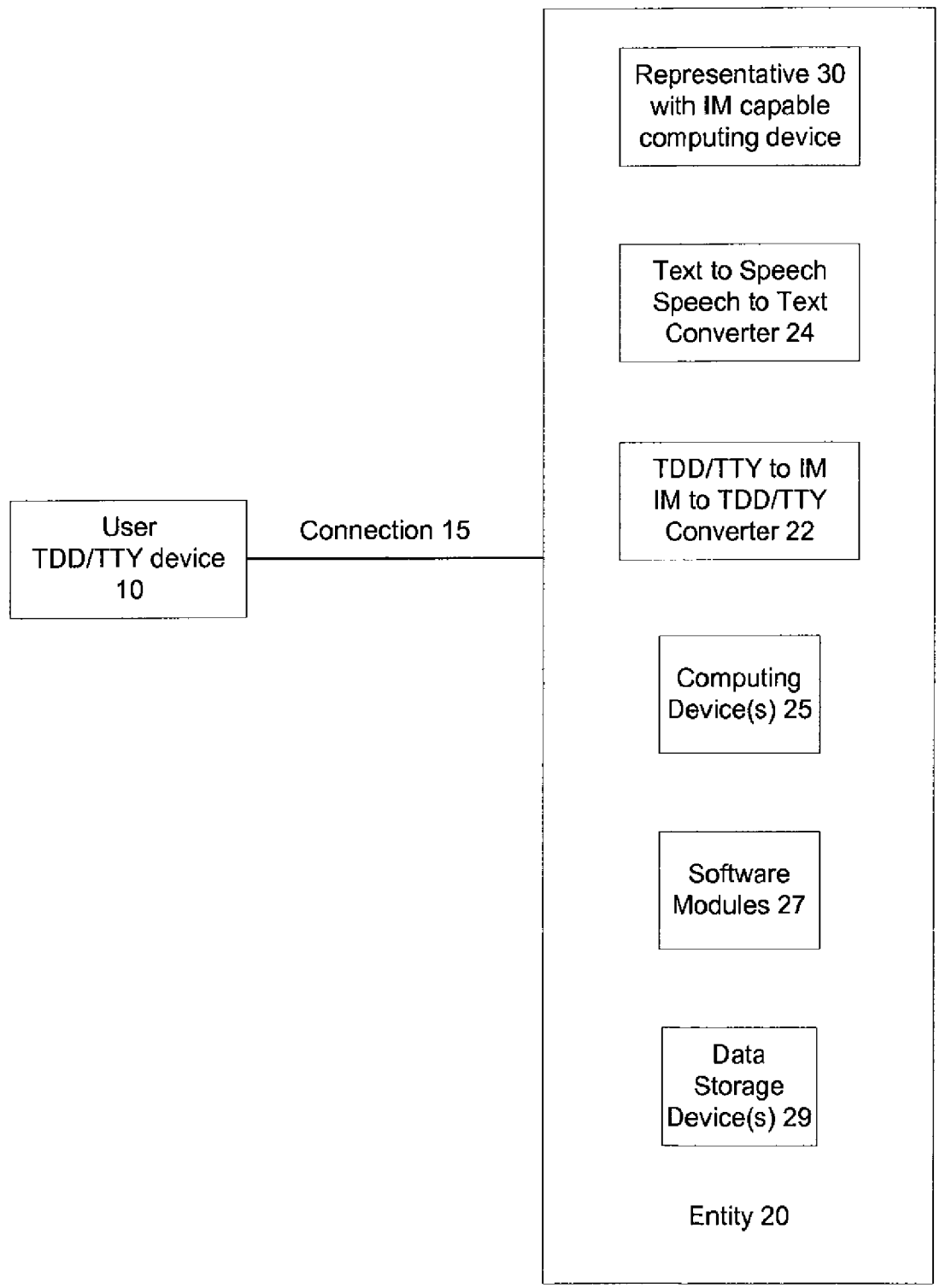
FIG. 3 is a block diagram of another implementation of a system that provides instant messaging between a TDD/TTY user and a recipient of a call from the TDD/TTY user.

Alternatively, TDD messages may be converted to IM messages and then to speech that is provided to the representative, and/or the representative may speak in response, and this speech is converted to IM, which is then converted to TDD messages and provided to the user. FIG. 3 is a block diagram of another implementation of a system that provides instant messaging between a TDD user and a recipient of a call from the TDD user, where the IM is converted to speech prior to delivery to the representative, and the representative's speech is converted to IM. FIG. 3 contains elements similar to those described above with respect to FIG. 1. These elements are labeled identically and their description is omitted for brevity.

In the implementation shown in FIG. 3, the entity further comprises a text-to-speech/speech-to-text converter 24. The converter 24 may convert the instant message, which was generated based on the TDD message, to speech that is then provided to the representative. The converter 24 may also convert the representative's speech to an instant message, which may then be converted to a TDD message that is provided to the user. In this manner, the representative may speak and listen as if conversing with a hearing user, and does not have to prepare instant messages. This provides further efficiencies, as the representative does not have to type or read IM text. The converter 24 may contain a well-known text-to-speech converter and a well-known speech-to-text converter, where the text that is being converted to and from may be IM. The text-to-speech converter and the speech-to-text converter may be separate components, modules, or applications, for example.

Figure 4:
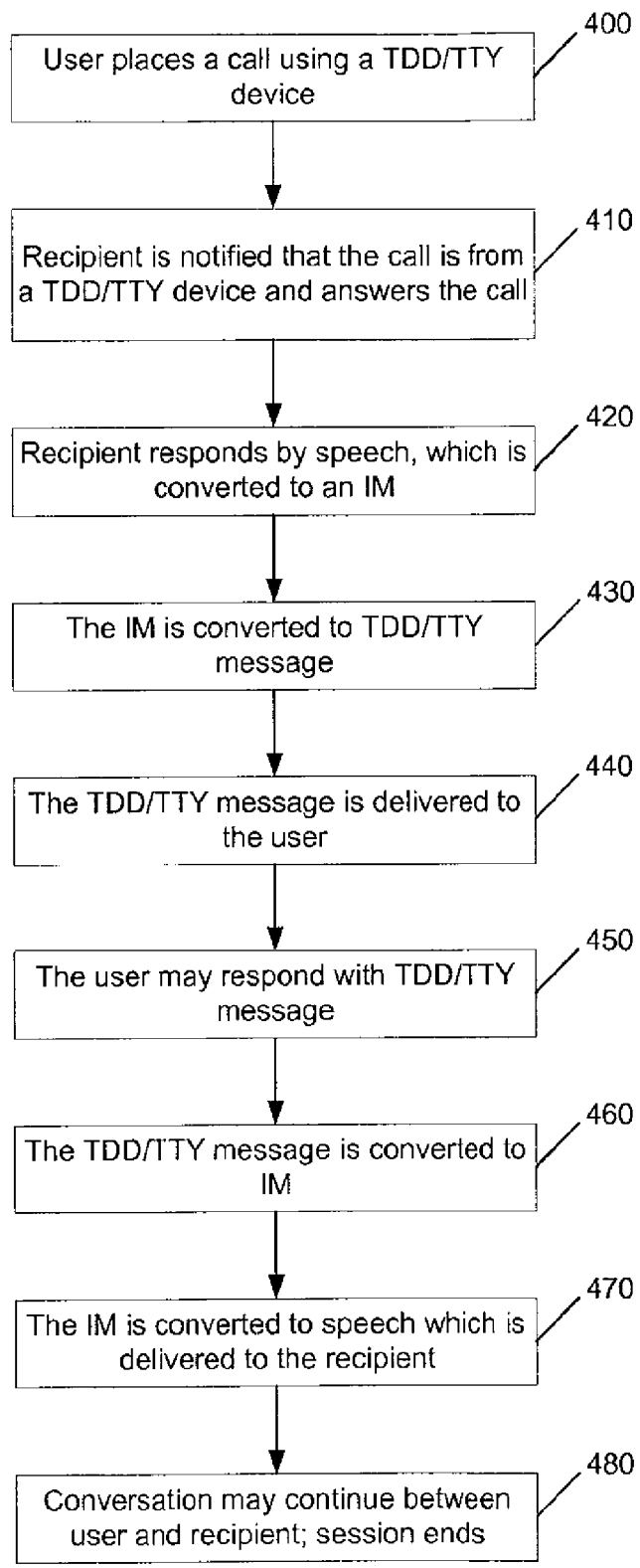
FIG. 4 is an operational flow of another implementation of a method that provides instant messaging between a TDD/TTY user and a recipient of a call from the TDD/TTY user.

FIG. 4 is an operational flow of another implementation of a method that provides instant messaging between a TDD user and a recipient of a call from the TDD user. The implementation of FIG. 4 may be similar to that described above with respect to FIG. 2, and includes the conversion of IM text to speech that may be delivered to the recipient of the call, and conversion of the recipient's speech to IM text, which may then be converted to a TDD message that is provided to the user. In an implementation, the recipient may be a representative of an entity, such as a financial services company or a bank, for example.

At operation 400, a user places a call through a TDD device to the entity. A representative associated with the entity may be notified that the incoming call is from a TDD device, at operation 410, similar to operation 210. Alternatively, the representative does not receive such notification, and the call comes to the representative as if the call were from a conventional phone as opposed to a TDD device.

At operation 420, the representative responds to or answers the call with speech (as opposed to typing an instant message as in the implementation of FIG. 2), which is then converted to an instant message. As with FIG. 2's implementation, the representative may request authentication information from the user, such as a password, code, credential, key, etc. The instant message is converted to a TDD message at operation 430, by converting the IM protocol to the TDD protocol, and the TDD message is then transmitted to the user at operation 440. In an alternative implementation, the representative's speech may be converted to a TDD message without the speech being converted to an instant message.

The user receives the TDD message at the TDD device, and may respond with a TDD message, at operation 450. The TDD message sent by the user's device is received and converted to an instant message at operation 460, by converting the TDD protocol to the IM protocol. The instant message is then converted to speech, at operation 470, and is delivered to the representative. In an alternative implementation, the user's TDD message may be converted to speech without the TDD message being converted to an instant message. In this manner, a two-way conversation may continue between the user and the representative, at operation 480, until the session ends.

Thus, as with the implementation of FIG. 2, a user may converse with a call recipient, via TDD messages translated to IM messages, using their TDD device or a properly equipped computing device. Because the call recipient may interact with the user by speech, as in a phone call with a hearing user, the call recipient's efficiency and accuracy may be increased, thereby saving time and expense.

Figure 5:
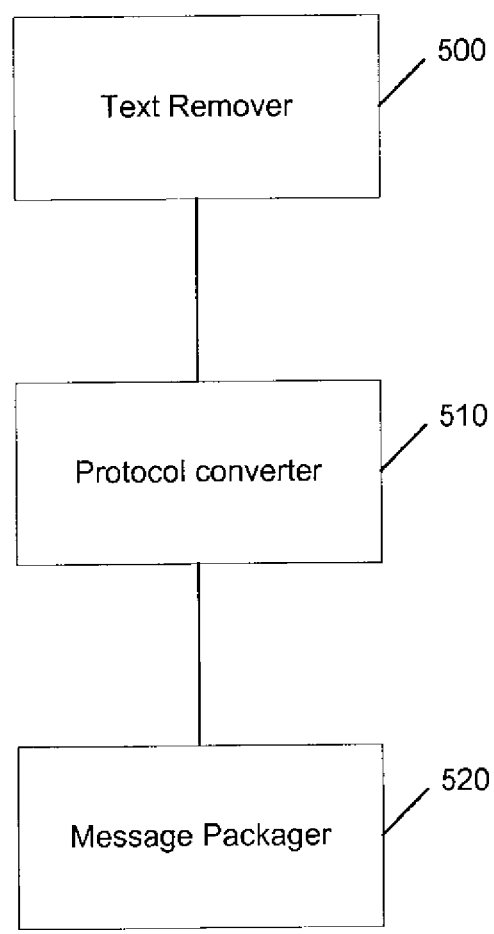
FIG. 5 is a block diagram of an implementation of a TDD/TTY to instant messaging converter.

FIG. 5 is a block diagram of an implementation of a converter that may be used to convert one type of message to another, such as TDD messages to IM messages, or IM messages to TDD messages. TDD has well defined protocols and there are many different TDD protocols. One protocol used by TDDs is the Baudot code implemented asynchronously at either 45.5 or 50 baud, 1 start bit, 5 data bits, and 1.5 stop bits. Other protocols that may be used for TDD are dual-tone multi-frequency (DTMF), V.23, etc. V.18 is a dual standard, as it is both an umbrella protocol that allows recognition and interoperability of some of the most commonly used TDD protocols, as well as offering a native V.18 mode, which is an American Standard Code For Information Interchange (ASCII) full- or half-duplex modulation method. Computers can, with appropriate software and modem, emulate a V.18 TDD or other TDD, for example. Some voice modems, coupled with appropriate software, can be converted to TDD modems by using a software-based decoder for TDD tones.

The TDD protocols are translated to a known instant messaging protocol, such as Windows messaging, I Seek You (ICQ), Internet Relay Chat (IRC), etc. For example, IRC is a form of real-time Internet chat or synchronous conferencing. It may be used for group (many-to-many) communication in discussion forums called channels, and it also allows one-to-one communication and data transfers via private messages. IRC is an open protocol that uses transmission control protocol (TCP) and also may use secure sockets layer (SSL). TCP is a protocol developed for the Internet to get data from one network device to another, and SSL is a security protocol for transactions on the Internet, that uses public-key cryptography to provide server authentication, data encryption, and data integrity.

A text remover 500 strips the text and other information (e.g., identifier, header, etc.) from the message. A protocol converter 510 converts the stripped text to the desired protocol, such as IRC, and a message packager 520 packages the converted text into an appropriate package for delivery, e.g., via an Internet chat system.

Figure 6:
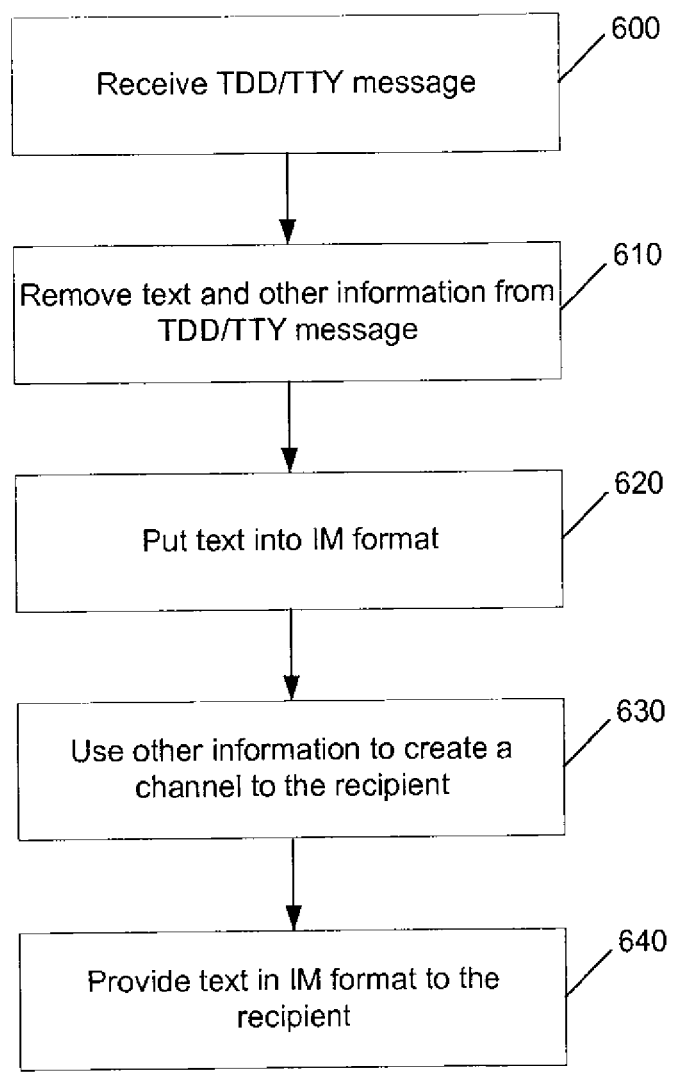
FIG. 6 is an operational flow of an implementation of a TDD/TTY to instant messaging method.

FIG. 6 is an operational flow of an implementation of a TDD to instant messaging method involving conversion of a TDD message to an IM message. The TDD message is received at operation 600, and the text and other information are stripped from it at operation 610. The text is put into IM format and properly packaged at operation 620, and a channel for delivery to the call recipient is created at operation 630, and may involve routing information, for example. The IM formatted message is then transmitted to the call recipient at operation 640.

Figure 7:
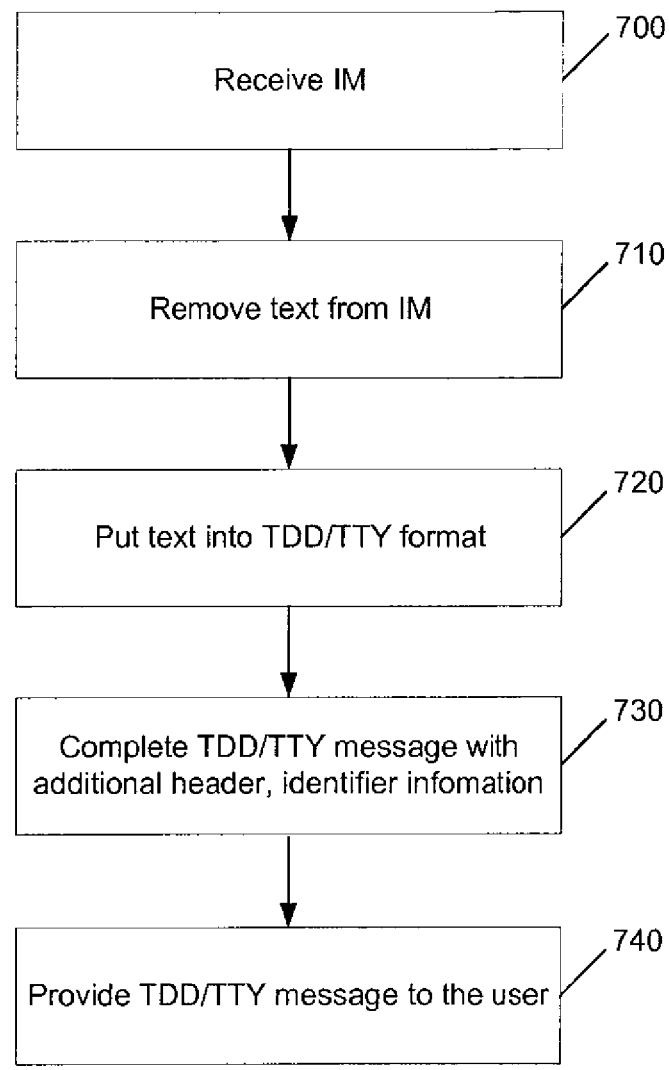
FIG. 7 is an operational flow of an implementation of an instant messaging to TDD/TTY messaging method.

FIG. 7 is an operational flow of an implementation of an IM to TDD messaging method involving conversion of an IM message to a TDD message. The IM message is received at operation 700, and the text and other information are stripped from it at operation 710. The text is put into TDD format and properly packaged at operation 720, and a channel for delivery to the TDD user is created at operation 730. The TDD formatted message is then transmitted to the TDD user at operation 740.

It is contemplated that the call recipient may be a person or an automated system involving computers, phones, or both. It is also contemplated that the call recipient described herein may initiate the call (e.g., the representative of the entity initiates the call). In such an implementation, the representative's call may be initiated as an IM, or speech converted to IM, and then converted to a TDD message and delivered to the user who would be the call recipient.

Exemplary Computing Arrangement

Figure 8:
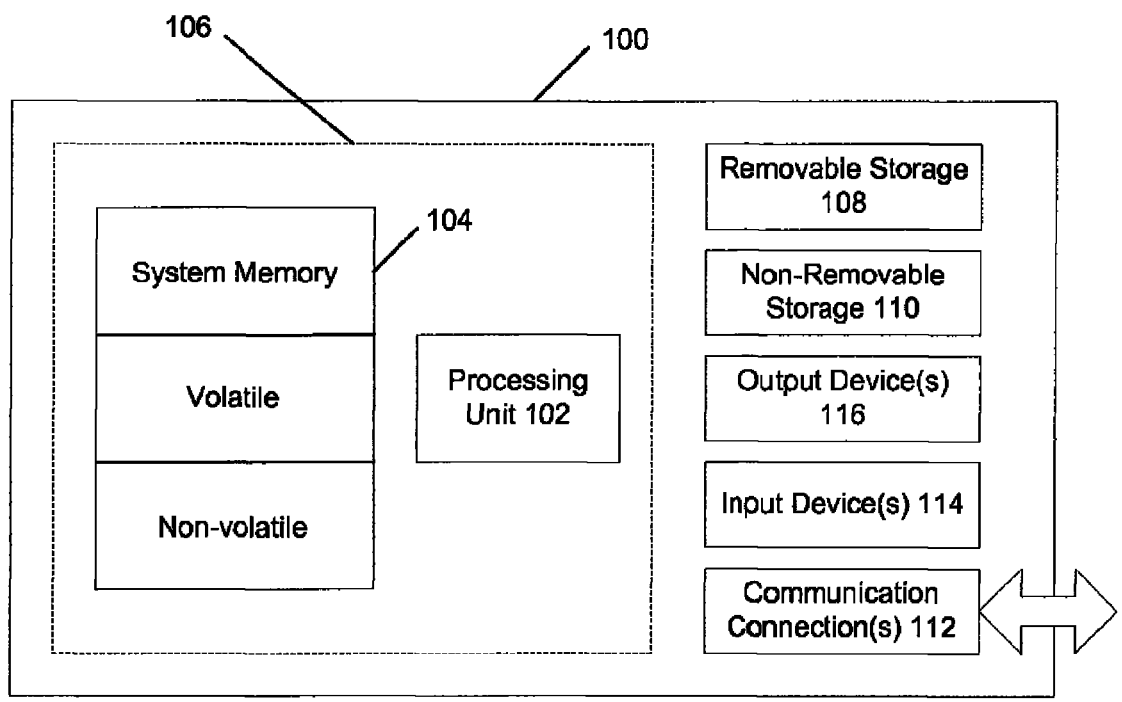
FIG. 8 is a block diagram of an example computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, or distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 8 by dashed line 106.

Computing device 100 may have additional features/functionality. For example, computing device 100 may include additional storage (removable and/or non-removable) including, but not limited to, magnetic or optical disks or tape. Such additional storage is illustrated in FIG. 8 by removable storage 108 and non-removable storage 110.

Computing device 100 typically includes a variety of computer-readable media. Computer-readable media can be any available media that can be accessed by computing device 100 and include both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Communications connection(s) 112 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. The term computer-readable media as used herein includes both storage media and communication media.

Device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and systems of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more program(s) that may implement or utilize the processes described in connection with the presently disclosed subject matter, e.g., through the use of an application program interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across multiple devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing communication, comprising:
   establishing a connection between a telecommunications device for the deaf (TDD) device and an entity;
   receiving a TDD message from the TDD device via the connection;
   converting the TDD message to a first instant messaging (IM) message;
   generating a second IM message; and
   converting the second IM message to a second TDD message.

2. The method of claim 1, comprising providing the second TDD message to the TDD device.

3. The method of claim 1, comprising establishing the connection between the TDD device and the entity by:
   receiving a phone call initiated by the TDD device;
   providing an indication to the entity that the phone call is from a TDD device; and
   responding to the indication.

4. The method of claim 3, wherein responding to the indication comprises selecting a button, an icon, or a link displayed on a display device.

5. The method of claim 4, wherein the selection causes a generation of the second IM message.

6. The method of claim 1, wherein the connection comprises at least one of a telephone connection or a network connection.

7. A non-transitory computer-readable medium comprising computer-readable instructions executable by a processor to:
   receive a first telecommunications device for the deaf (TDD) message from a TDD device;
   generate an instant messaging (IM) message based on the TDD message;
   convert the IM message to speech; and
   authenticate a user of the TDD device via a combination of the speech, the IM message, and the first TDD message.

8. The medium of claim 7, comprising instructions executable by a processor to generate a second TDD message.

9. The medium of claim 7, comprising instructions executable by a processor to provide the second TDD message to the TDD device.

10. The medium of claim 7, comprising instructions executable by a processor to provide the speech to a computing device.

11. The medium of claim 7, wherein the instructions executable to generate the IM message comprise instructions executable to convert the first TDD message to the IM message.

12. The medium of claim 7, further comprising instructions executable to:
   establish a connection between the TDD device and a computing device associated with an entity;
   receive a phone call initiated by the TDD device;
   provide an indication to the computing device that the phone call is from the TDD device; and
   answer the phone call in response to the indication.

13. The computer-readable medium of claim 12, wherein the instructions executable to answer the phone call comprise instructions executable to:
   receive speech from a user associated with the computing device;
   convert the speech to an answer IM message;
   convert the answer IM message to the second TDD message; and
   provide the second TDD message to the TDD device.

14. A non-transitory computer-readable medium comprising computer-readable instructions executable by a processor to:
   receive a first text message from a first computing device in a first protocol at a second computing device, at least one of the first computing device and the second computing device comprising a telecommunications device for the deaf (TDD) device;
   generate a second text message in a second protocol based on the first text message;
   authenticate a user of the first computing device or the second computing device;
   generate a third text message in the second protocol to respond to the first text message; and
   convert the third text message to a fourth text message in the first protocol.

15. The medium of claim 14, wherein the first protocol is an instant messaging (IM) protocol and the second protocol is a TDD protocol.

16. The medium of claim 15, wherein the instructions executable to generate the text message in the TDD protocol comprise instructions executable to:
   remove text and other information from the first text message in the IM protocol;
   put the text into TDD format; and
   add header and identifier information in TDD format based on the removed other information.

17. The medium of claim 14, wherein the first protocol is a TDD protocol and the second protocol is an instant messaging (IM) protocol.

18. The medium of claim 17, wherein the instructions executable to generate the text message in the IM protocol comprise instructions executable to:
   remove text and other information from the first text message in the TDD protocol;
   put the text into IM format; and
   create a channel for the second text message in the IM protocol based on the removed other information.

19. The medium of claim 14, comprising instructions executable by a processor to send the fourth text message in the first protocol to the first computing device.

20. The medium of claim 14, wherein the first computing device comprises the TDD device, and further comprising instructions executable by a processor to provide the second text message in the second protocol to an entity.

* * * * *